(12) United States Patent
Bae et al.

(10) Patent No.: US 7,124,421 B2
(45) Date of Patent: Oct. 17, 2006

(54) LEAD SCREW ADJUSTMENT STRUCTURE OF DISC DRIVE

(75) Inventors: Won-youl Bae, Gyeonggi-do (KR); Chan-bum Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 483 days.

(21) Appl. No.: 10/736,840

(22) Filed: Dec. 17, 2003

(65) Prior Publication Data

US 2005/0034141 A1    Feb. 10, 2005

(30) Foreign Application Priority Data

Aug. 4, 2003    (KR)    ............... 10-2003-0053881

(51) Int. Cl.
*G11B 7/085*    (2006.01)
(52) U.S. Cl. .................................... 720/675
(58) Field of Classification Search ............... 720/675, 720/676, 677, 663; 369/249.1, 263.1, 219.1; 360/267.4
See application file for complete search history.

(56) References Cited

U.S. PATENT DOCUMENTS

| | | | | |
|---|---|---|---|---|
| 5,303,223 A | * | 4/1994 | Sakaguchi et al. | 720/663 |
| 5,687,159 A | * | 11/1997 | Kim | 720/677 |
| 5,995,479 A | * | 11/1999 | Takizawa et al. | 720/675 |
| 6,058,098 A | * | 5/2000 | Kato | 720/663 |
| 6,765,859 B1 | * | 7/2004 | Akiba | 369/249.1 |
| 6,795,971 B1 | * | 9/2004 | Lin | 720/679 |
| 6,922,840 B1 | * | 7/2005 | Fujibayashi et al. | 720/675 |
| 7,003,787 B1 | * | 2/2006 | Sawada et al. | 720/659 |

FOREIGN PATENT DOCUMENTS

JP    2002-042432    2/2002

OTHER PUBLICATIONS

Korean Office Action Issued Apr. 14, 2005.

* cited by examiner

*Primary Examiner*—Angel Castro
(74) *Attorney, Agent, or Firm*—Staas & Halsey LLP (57) ABSTRACT

A lead screw adjustment structure of a disc drive to adjust a lead screw which is rotatably installed on a pickup deck and reciprocates a pickup, which includes an incorporated elastic member installed on the pickup deck to apply an elastic force in an upward direction and an axial direction to one end portion of the lead screw, and an adjustment screw disposed above the elastic member to adjust the end portion of the lead screw up and down by being rotated.

25 Claims, 6 Drawing Sheets

LEAD SCREW ADJUSTMENT STRUCTURE OF DISC DRIVE

CROSS-REFERENCE TO RELATED APPLICATIONS

This application claims the priority of Korean Patent Application No. 2003-53881, filed on 4 Aug. 2003, in the Korean Intellectual Property Office, the disclosure of which is incorporated herein in its entirety by reference.

BACKGROUND OF THE INVENTION

1. Field of the Invention

The present invention relates to a lead screw adjustment structure of a disc drive, and more particularly, to a lead screw adjustment structure of a disc drive having an incorporated leaf spring which supports one end portion of a lead screw in an axial direction and simultaneously adjusts the lead screw in upward and downward directions.

2. Description of the Related Art

In general, disc drives record information discs such as a CD or DVD and/or are able to reproduce the recorded information. Disc drives generally include a pickup to record information or reproduce the recorded information by emitting light on a recording surface of a rotating disc while sliding in a radial direction of the disc.

Figure 1:
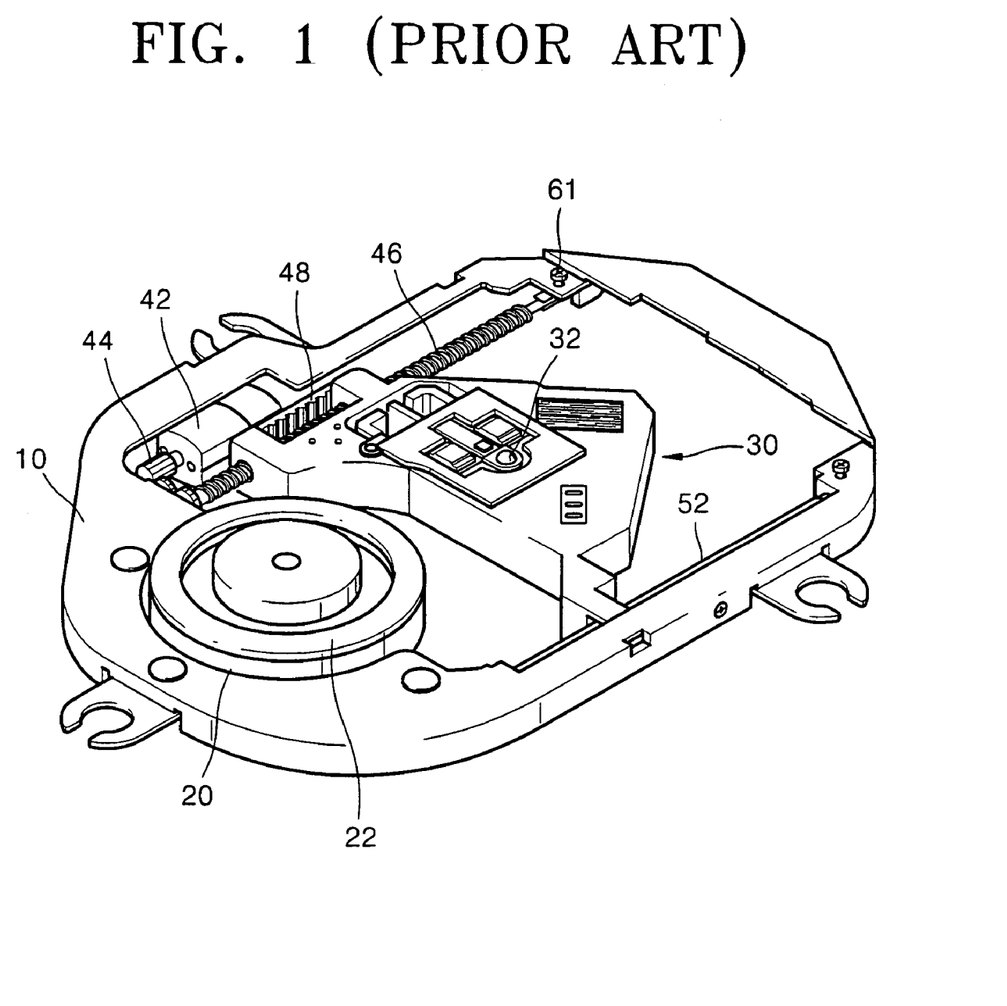
FIGS. 1 and 2 are a perspective view and a plan view, respectively, illustrating the conventional pickup assembly of a disc drive.
Figure 2:
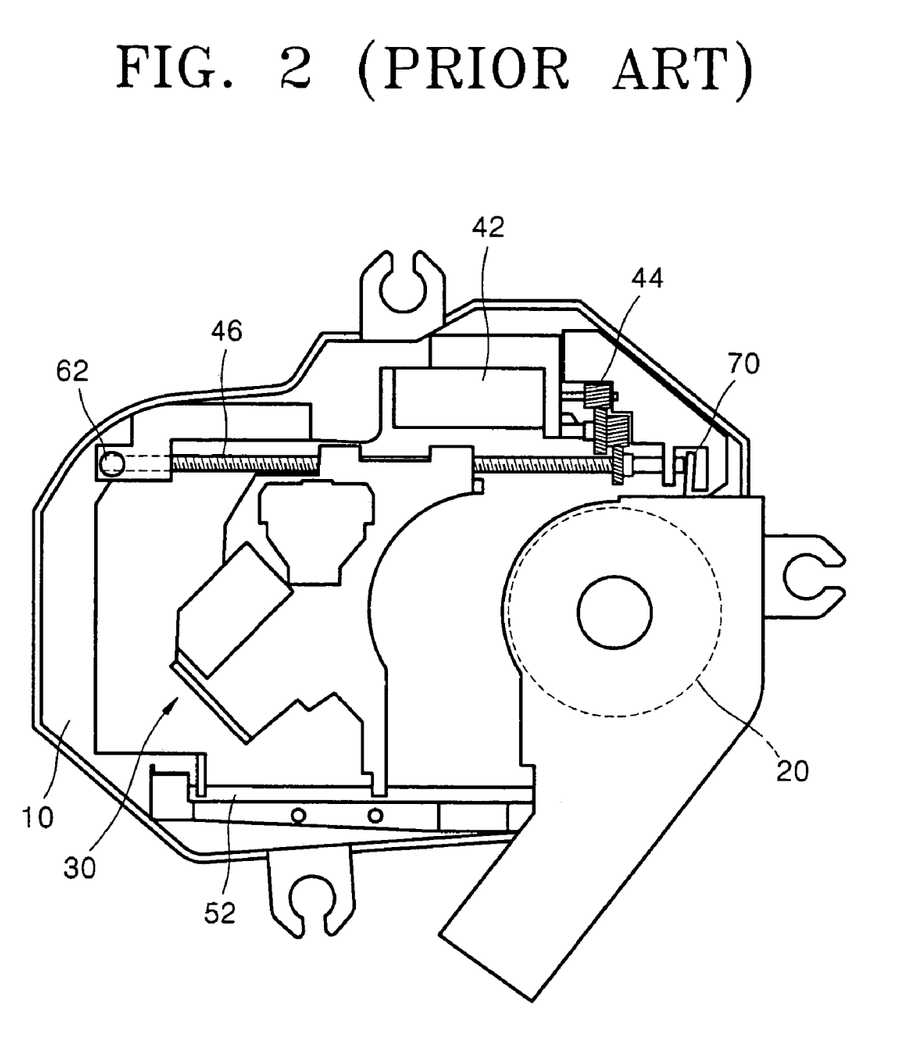

FIGS. 1 and 2 show a conventional pickup assembly in a disc drive. Referring to FIGS. 1 and 2, the disc drive includes a pickup deck 10 on which a spindle motor 20 to rotate a disc and a pickup 30 to perform recording and reproduction of data by emitting light on a recording surface of the disc are installed. The pickup deck 10 is installed on a disc tray (not shown) carrying a disc in a slim disc drive adopted in a notebook computer, or at a main frame forming a housing in a typical disc drive. A turntable 22 where the disc is placed is provided on an upper portion of the spindle motor 20. Various optical elements including an objective lens 32 are provided at the pickup 30.

The pickup 30 emits light on the recording surface of the disc while moving in the radial direction of the disc. A lead screw 46 is rotatably installed at one side of the pickup deck 10 for the transfer of the pickup 30. The lead screw 46 is rotated by receiving power from a drive motor 42 via connection gears 44. A slider 48 having protruding portions engaged with screw grooves of the lead screw 46 to convert the rotational motion of the lead screw 46 to a linear motion of the pickup 30 is fixedly installed at one side of the pickup 30. A guide shaft 52 which guides movement of the pickup 30 is installed at the other side of the pickup deck 10 parallel to the lead screw 46.

A light spot is accurately formed only when the light emitted from the pickup 30 is perpendicularly incident on the recording surface of the disc. In order to accurately input the light perpendicularly on the recording surface of the disc, a degree of being parallel between the disc and the pickup 30 needs to be adjusted, which is referred to as tilt control or skew control. For the skew control, a spring 62 and an adjustment screw 61 which support one end portion of the lead screw 46 are installed on the pickup deck 10. The spring 62 applies an elastic force in a direction in which the end portion of the lead screw 46 is pushed upward while the adjustment screw 61 presses down the end portion of the lead screw 46 from the opposite side. In this state, when the adjustment screw 61 is turned, the end portion of the lead screw 46 is moved up and down so that the screw control is performed.

A leaf spring 70 supporting the lead screw 46 in an axial direction is installed on the pickup deck 10. The leaf spring 70 presses the other end portion of the lead screw 46 in the axial direction so that the movement of the lead screw 46 in the axial direction as the pickup 30 moves between the inner and outer circumferential sides of the disc is prevented.

As described above, in the conventional disc drive, the spring 62 for the skew control and the leaf spring 70 supporting the lead screw 46 in the axial direction are separately provided. However, when the springs are separately provided, the inner space of the disc drive increases so that designing a slim disc drive is restricted. Also, since the springs are separately used, a material cost and an assembly cost are raised.

SUMMARY OF THE INVENTION

Accordingly, the present invention provides a lead screw adjustment structure of a disc drive having an incorporated leaf spring which supports one end portion of a lead screw in an axial direction and simultaneously adjusts the lead screw in up and down directions.

According to an aspect of the present invention, a lead screw adjustment structure of a disc drive adjusts a lead screw, which is rotatably installed on a pickup deck and reciprocates a pickup. The lead screw adjustment structure comprises an incorporated elastic member, installed on the pickup deck, to apply an elastic force in an upward direction and an axial direction to one end portion of the lead screw; and an adjustment screw disposed above the elastic member to adjust the end portion of the lead screw up and down by being rotated.

In an embodiment of the invention, the elastic member is installed on a lower surface of the pickup deck and the adjustment screw penetrates the pickup deck disposed above the elastic member.

In an embodiment of the invention, the elastic member comprises a base portion fixed to the lower surface of the pickup deck, a first pressing portion extended from the base portion to apply an elastic force in the upward direction to the end portion of the lead screw, and a second pressing portion extended from the first pressing portion to apply an elastic force in the axial direction to the end portion of the lead screw. The adjustment screw is disposed above the first pressing portion.

In an embodiment of the invention, the elastic member is a leaf spring.

In an embodiment of the invention, a support member supporting the leaf spring is provided between the pickup deck and the leaf spring. A first through hole rotatably supporting the end portion of the lead screw is formed at one end portion of the support member. The end portion of the lead screw passing through the first through hole contacts the second pressing portion. The adjustment screw contacts an upper surface of the support member after penetrating the pickup deck.

In an embodiment of the invention, a guide member where the second through hole guiding upward and downward movements of the end portion of the lead screw is formed is provided in front of the end portion of the support member.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
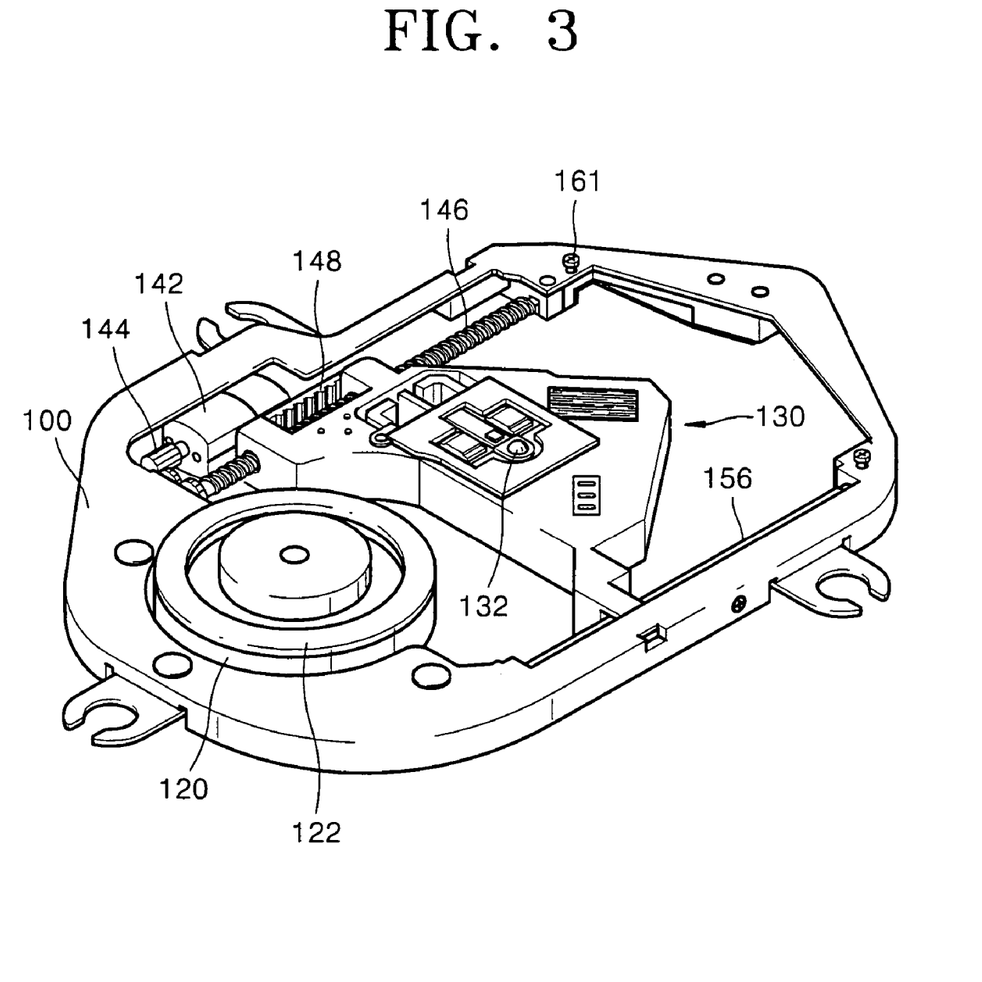
FIGS. 3 and 4 are perspective views illustrating the upper portion and the lower portion of a pickup assembly adopting a lead screw adjustment structure according to a embodiment of the present invention, respectively.
Figure 4:
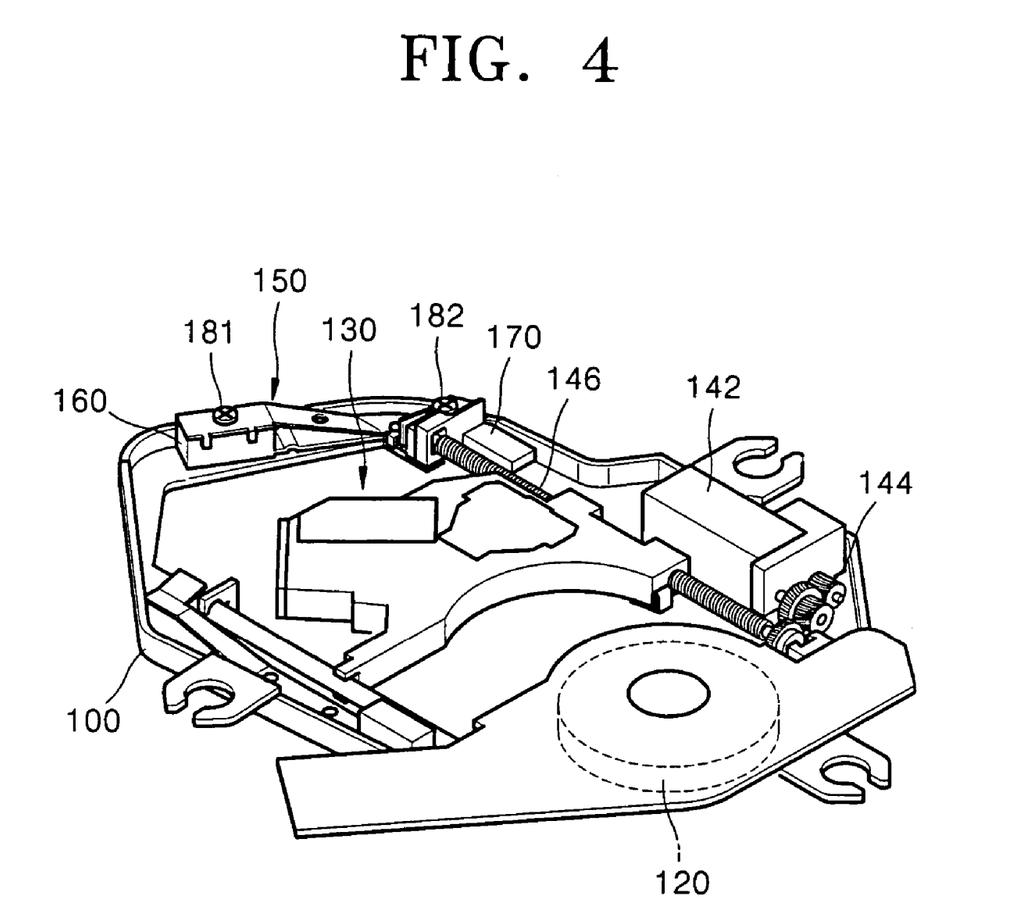

Referring to FIGS. 3 and 4, a disc drive adopting a lead screw adjustment structure according to an embodiment of the present invention includes a spindle motor 120 to rotate a disc and a pickup 130 to perform recording and reproduction of data by emitting light on a recording surface of the disc. The spindle motor 120 and the pickup 130 are installed on a pickup deck 100. A turntable on which the disc is placed is provided at an upper portion of the spindle motor 120. Various optical elements, including an objective lens 132, are provided on the pickup 130.

The pickup 130 moves in a radial direction of the disc and records/reproduces information by emitting light on the recording surface of the disc. A lead screw 146 is installed at one side of the pickup deck 100 to reciprocate the pickup 130. The lead screw 146 is rotated by receiving power from a drive motor 142 via connection gears 144. In order to convert a rotational motion of the lead screw 146 to a linear motion of the pickup 130, a slider 148 having protruding portions engaged with screw grooves of the lead screw 146 is fixedly installed at one side of the pickup 132. A guide shaft 156 guiding the movement of the pickup 130 is installed at the other side of the pickup deck 100 parallel to the lead screw 146.

A lead screw adjustment structure of a disc drive which supports one end portion of the lead screw 146 in the axial direction and simultaneously adjusts the end portion of the lead screw 146 in the upward and downward direction is provided on the pickup deck 100.

Figure 5:
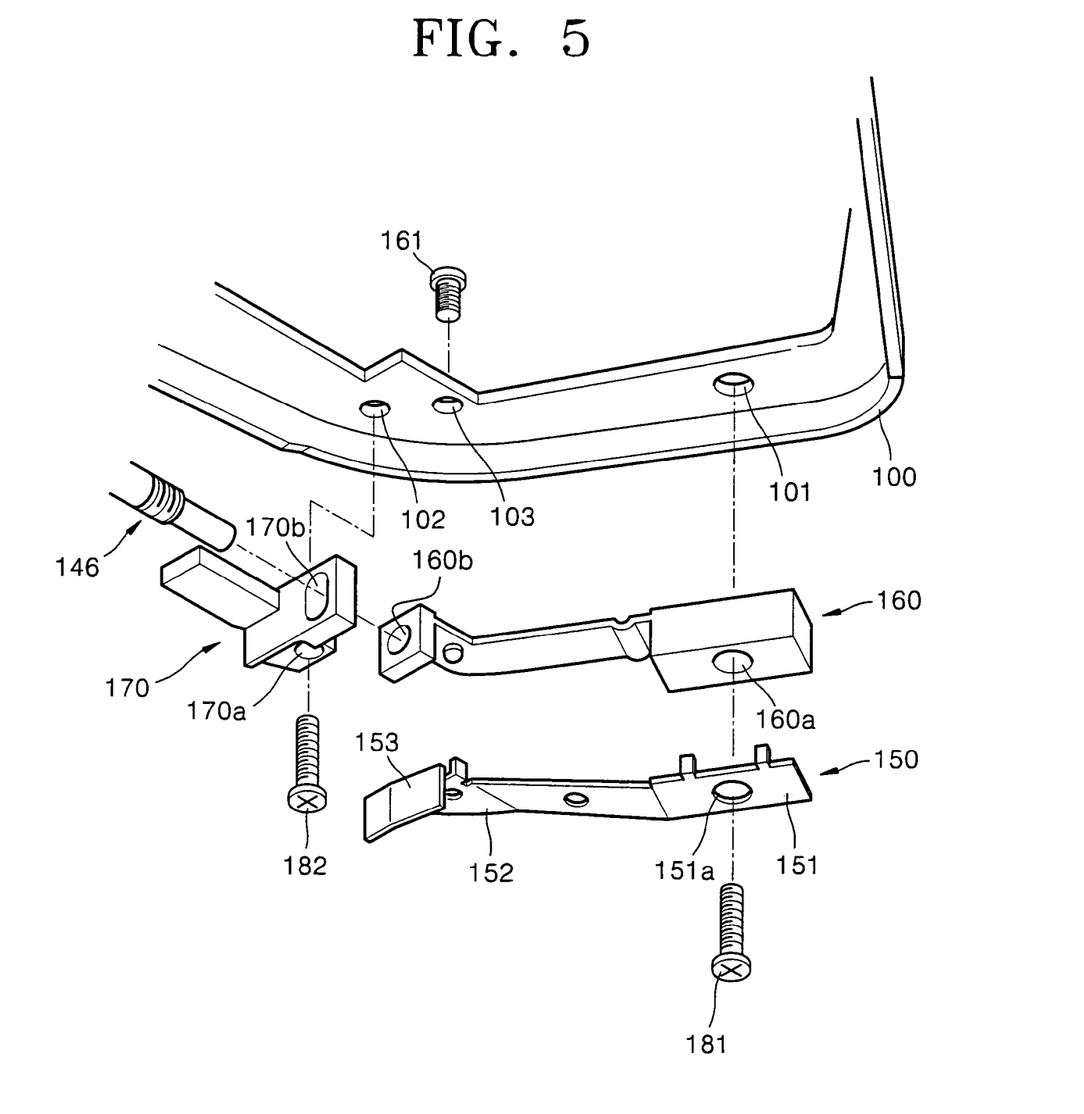
FIG. 5 is an exploded perspective view illustrating the lead screw adjustment structure according to the embodiment of the present invention.
Figure 6:
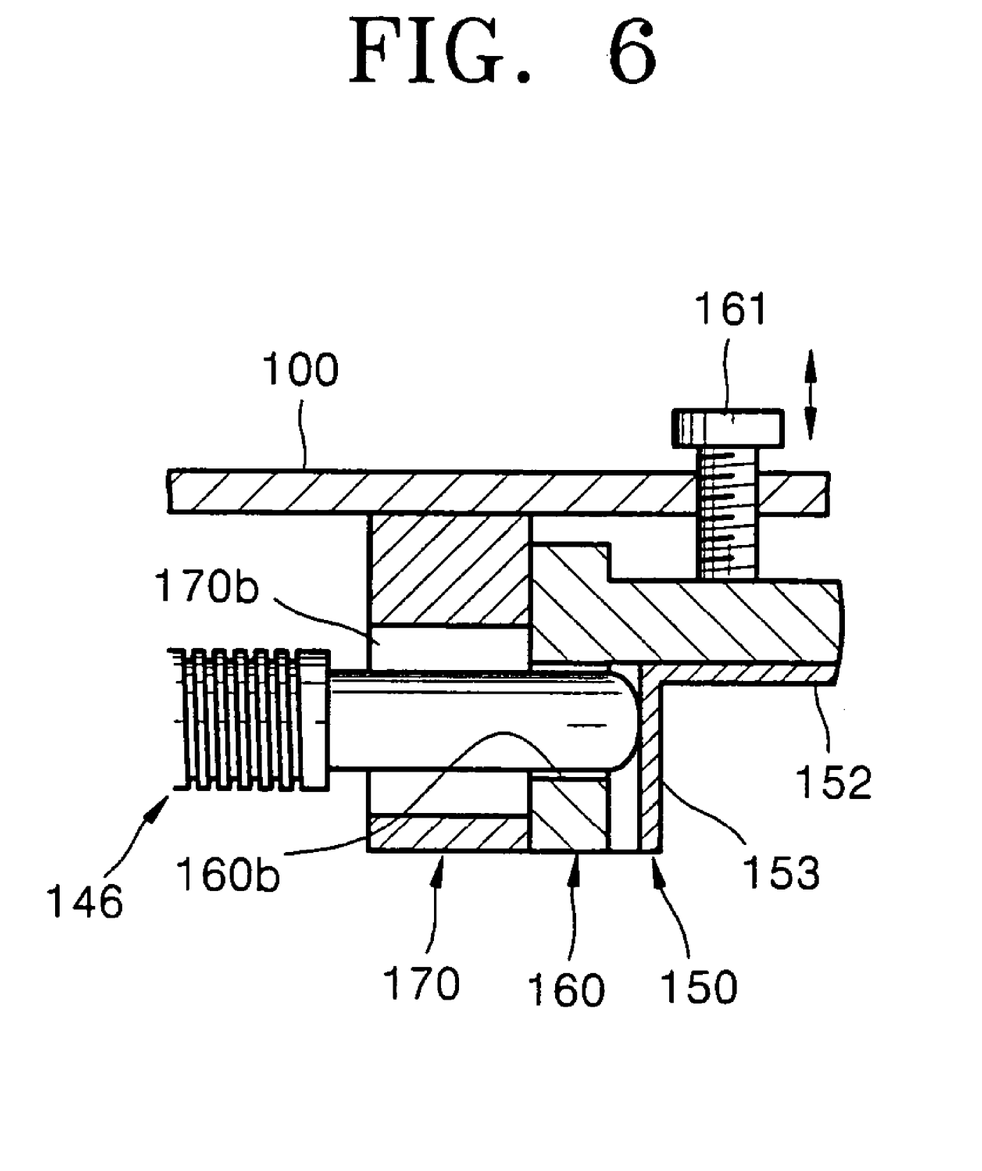
FIG. 6 is a sectional view illustrating the lead screw adjustment structure according to the embodiment of the present invention.

FIGS. 5 and 6 show the structure of the lead screw adjustment structure according to the embodiment of the present invention.

Referring to FIGS. 5 and 6, the lead screw adjustment structure, according to the embodiment of the present invention, includes a support member 160 installed on a lower surface of the pickup deck 100 to rotatably support one end portion of the lead screw 146, an integrated leaf spring 150 installed on a lower surface of the support member 160 to apply an elastic force in an axial direction and an upward direction at one end portion of the lead screw 146, and an adjustment screw 161, installed on an upper surface of the support member 160 by penetrating the pickup deck 100, to adjust the end portion of the lead screw 146 in the upward and downward directions by the rotation thereof.

The adjustment screw 161 moves the end portion of the support member 160 upwards and downwards, together with a first pressing portion 152 of the leaf spring 150, which is described later. To this end, a first through hole 160*b*, that one end portion of the lead screw 146 penetrates, is formed in one end portion of the support member 160. The other end portion of the support member 160 is fixed to the lower surface of the pickup deck 100 by a first screw 181 and coupling holes 151*a*, 160*a*, and 101, together with a base portion 151 of a leaf spring 150, which is described later.

A guide member 170 guiding the up/down movement of the end portion of the lead screw 146 is provided in front of the end portion of the support member 160. A second through hole 170*b* is formed in the guide member 170 so that the end portion of the lead screw 146 moves up and down. The guide member 170 is fixed to the lower surface of the pickup deck 100 by a second screw 182 and coupling holes 170*a* and 102.

The leaf spring 150 is an integrated elastic member which applies an elastic force in the upward direction and the axial direction to the end portion of the lead screw 146, and includes the base portion 151, the first pressing portion 152, and a second pressing portion 153.

The base portion 151 is fixed to the lower surface of the pickup deck 100 by the first screw 181 and the coupling holes 151*a*, 160*a*, and 101, together with the other end portion of the support member 160.

The first pressing portion 152 is extended from the base portion 151 and applies an elastic force in the upward direction to the end portion of the lead screw 146. For this purpose, the first pressing portion 152 applies an elastic force in a direction in which one side portion of the support member 160, in which the end portion of the lead screw 146 is inserted, is pushed.

The second pressing portion 153 is extended from the first pressing portion 151, and is bent at an angle from the first pressing portion. The second pressing portion 153 applies an elastic force in the axial direction to the end portion of the lead screw 146. To this end, the second pressing portion 152 contacts the end portion of the lead screw 146, which passes through the second through hole 170*b* of the guide member 170 and the first through hole 160*b* of the support member 160, to push the end portion of the lead screw 146 in the axial direction.

The adjustment screw 161 is inserted in an adjustment screw insertion hole 103 and contacts the upper surface of the support member 160 corresponding to the first pressing portion 152 of the leaf spring 150, to press the end portion of the support member 160 from the upside. The one side portion of the support member 160 is moved up and down according to the rotational direction of the adjustment screw 161. Accordingly, the end portion of the lead screw 146 is moved up or down.

In the above lead screw adjustment structure, when the adjustment screw 161, disposed above the first pressing portion 152 of the leaf spring 150, is turned, inclination the lead screw 146 is adjusted. Screw control is thereby performed. The light emitted from the pickup 130 is accurately and perpendicularly incident on the recording surface of the disc by the skew control.

Since the second pressing portion 153 of the leaf spring 150 applies an elastic force in the axial direction to the end portion of the lead screw 146, the movement of the pickup 130 forward and backward when the pickup 130 is transferred is prevented. Also, when an elastic force in the axial direction is applied to the end portion of the lead screw 146, a problem that an overload is applied to the drive motor 142 for the next transfer after the pickup 130 is transferred to the innermost circumference of the disc is solved.

As described above, the lead screw adjustment structure of a disc drive according to the present invention has the following effect.

First, by supporting one end of the lead screw in the axial direction and simultaneously adjusting the end portion up and down by using an incorporated leaf spring, a design space needed to make a slim disc drive is obtained.

Second by replacing two springs with a single leaf spring, an assembly cost and a material cost are reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lead screw adjustment structure of a disc drive to adjust a lead screw, which is rotatably installed on a pickup deck and reciprocates a pickup, the lead screw adjustment structure comprising:
    an incorporated elastic member installed on the pickup deck to apply an elastic force in an upward direction and an axial direction to one end portion of the lead screw; and
    an adjustment screw, disposed above the elastic member, which adjusts the end portion of the lead screw up and down, when the adjustment screw is rotated.

2. The lead screw adjustment structure as claimed in claim 1, wherein the elastic member is installed on a lower surface of the pickup deck and the adjustment screw penetrates the pickup deck disposed above the elastic member.

3. The lead screw adjustment structure as claimed in claim 2, wherein the elastic member comprises:
    a base portion fixed at a predetermined distance to the lower surface of the pickup deck;
    a first pressing portion, connected to the base portion and extending from the base portion towards the lower surface of the pickup deck, to apply an elastic force in the upward direction to the end portion of the lead screw; and
    a second pressing portion, extended from the first pressing portion, to apply an elastic force in the axial direction to the end portion of the lead screw.

4. The lead screw adjustment structure as claimed in claim 3, wherein the elastic member further comprises a leaf spring connecting the base portion and the first pressing portion.

5. The lead screw adjustment structure as claimed in claim 4, further comprising a support member, supporting the leaf spring, is provided between the pickup deck and the leaf spring.

6. The lead screw adjustment structure as claimed in claim 5, wherein a first through hole, rotatably supporting the end portion of the lead screw, is formed at one end portion of the support member.

7. The lead screw adjustment structure as claimed in claim 6, wherein the end portion of the lead screw, passing through the first through hole, contacts the second pressing portion.

8. The lead screw adjustment structure as claimed in claim 6, further comprising a guide member, having a second through hole to guide upward and downward movements of the end portion of the lead screw, wherein the guide member is provided in front of the one end portion of the support member.

9. The lead screw adjustment structure as claimed in claim 5, wherein the adjustment screw contacts an upper surface of the support member after penetrating the pickup deck.

10. The lead screw adjustment structure as claimed in claim 3, wherein the adjustment screw is disposed above the first pressing portion.

11. A lead screw adjustment structure of a disc drive, which reads and/or records information on a surface of a disc, comprising:
    a lead screw having first and second ends, radially extending across the surface, to rotate in first and second directions;
    a pickup, to move along an axial direction of the lead screw based on a translation of the rotational movement of the lead screw into a linear force, to record and/or reproduce information on the surface;
    an elastic member, to apply elastic forces in radial and axial directions to one of the ends of the lead screw, to maintain a parallel relationship between the lead screw and the surface.

12. The lead screw adjustment structure according to claim 11, further comprising:
    a spindle motor to rotate the disc; and
    a pickup deck having an upper surface above which the disc rotates and a lower surface on which the pickup and the spindle motor are installed.

13. The lead screw adjustment structure according to claim 12, wherein the elastic member is installed on a lower surface of the pickup deck.

14. The lead screw adjustment structure according to claim 13, further comprising an adjustment screw to adjust the elastic member, wherein the adjustment screw penetrates the pickup deck and contact the elastic member from above the upper surface.

15. The lead screw adjustment structure according to claim 14, wherein the elastic member comprises:
    a base portion fixed at a distance to the lower surface of the pickup deck;
    a first pressing portion, connected to the base portion and extending from the base portion towards the lower surface of the pickup deck, to apply a radially elastic force on the lead screw; and
    a second pressing portion, extended from the first pressing portion, to apply an axially elastic force on the lead screw.

16. The lead screw adjustment structure according to claim 15, wherein the elastic member further comprises a leaf spring connecting the base portion and the first pressing portion.

17. The lead screw adjustment structure according to claim 16, further comprising a support member, having an end which cooperates with the one end of the lead screw, to support the leaf spring, wherein the support member is between the pickup deck and the leaf spring.

18. The lead screw adjustment structure according to claim 17, further comprising a first through hole, to rotatably support the one end of the lead screw, formed at the end of the support member.

19. The lead screw adjustment structure according to claim 18, wherein the one end of the lead screw passes through the first through hole and contacts the second pressing portion.

20. The lead screw adjustment structure according to claim 18, further comprising a guide member, having a second through hole to guide upward and downward movements of the one end of the lead screw.

21. The lead screw adjustment structure according to claim 20, wherein the guide member is adjacent to the end of the support member.

22. The lead screw adjustment structure according to claim 17, wherein the support member comprises an upper surface which comes in contact with the adjustment screw after the adjustment screw penetrates the pickup deck.

23. The lead screw adjustment structure according to claim 15, wherein the adjustment screw is located above the first pressing portion, to adjust the radially elastic force applied by the elastic member.

24. An adjustable elastic member apparatus to adjust the attitude and location of a lead screw relative to a disc surface, while a pickup, attached to a deck, travels along the disc surface, the adjustable elastic member comprising:
   a guide, through which an end of the lead screw extends, to guide vertical movement of the lead screw;
   a support on an underside of the deck, having an abutting end, into which the end of the lead screw fits, and a supporting end which extends lower than the connection portion;
   an adjustment screw to penetrate the deck and to contact an upper side of the support; and
   an elastic member having a base fitted to the supporting end of the support, a first pressing portion coupled to the base portion, to exert a vertical elastic force on an underside of the support, and a second pressing portion to exert an axial elastic force on the end of the lead screw.

25. An elastic member apparatus to adjust the attitude and location of a lead screw relative to a disc surface, while a pickup, attached to a deck, travels along the disc surface, having a guide, through which an end of the lead screw extends, to guide vertical movement of the lead screw, and a support on an underside of the deck, having an abutting end, through which the end of the lead screw tightly extends, and a supporting end which extends lower than the connection portion, the elastic member comprising:
   an adjustment screw to penetrate the deck and to contact an upper side of the support;
   a base of an elastic member, fitted to the supporting end of the support;
   a first pressing portion coupled to the base portion, to exert a vertical elastic force on an underside of the support; and
   a second pressing portion to exert an axial elastic force on the end of the lead screw.

* * * * *